United States Patent [19]

Yao

[11] Patent Number: 5,709,319
[45] Date of Patent: Jan. 20, 1998

[54] FOOD DISTRIBUTOR

[76] Inventor: Chia-Wang Yao, No. 9, Lane 114, Sec 1, Ta Tung Rd., Yuanlin Chen, Changhua Hsien, Taiwan

[21] Appl. No.: 727,228

[22] Filed: Oct. 8, 1996

[51] Int. Cl.$^6$ ................................................ B67D 5/64
[52] U.S. Cl. .................. 222/170; 222/181.1; 222/240; 119/51.04
[58] Field of Search ................. 119/230, 51.04; 222/169, 170, 239, 240, 181.1, 354, 355, 333, 456

[56] References Cited

U.S. PATENT DOCUMENTS

| | | | |
|---|---|---|---|
| 2,700,489 | 1/1955 | Sheft | 222/170 |
| 3,592,368 | 7/1971 | Huette | 222/239 |
| 3,688,744 | 9/1972 | Kaplan | 119/51.04 |
| 5,037,018 | 8/1991 | Matsuda et al. | 222/650 |
| 5,259,533 | 11/1993 | Kornfein et al. | 222/170 |

*Primary Examiner*—Philippe Derakshani
*Attorney, Agent, or Firm*—Morton J. Rosenberg; David I. Klein; Jun Y. Lee

[57] ABSTRACT

A food distributor includes a box with a cover and a distributing member rotatably disposed to a front side of the box, the front side of the box having a first hole defined therein, the distributing member having a first circular flange extending from a rear wall thereof and the first circular flange having a threaded inner periphery, a second hole defined in the rear wall from which a second circular flange extends to enclose the second hole such that the distributing member is connected to the front side by engaging the second circular flange with the first hole, the distributing member having at least one outlet defined in a peripheral wail thereof, a stirring shaft extending from a front wail through the second hole and the first hole of the box, a motor disposed to the box so as to mechanically drive the threaded inner periphery to rotate the distributing member.

5 Claims, 4 Drawing Sheets

FOOD DISTRIBUTOR

BACKGROUND OF THE INVENTION

1. Field of the Invention

The present invention relates to a food distributor and more particularly, to a food distributor for fish and the food distributor has a rotatable case with a stirring shaft disposed therein so as to disturb fish food in the distributor.

2. Brief Description of the Prior Art

Generally, a food distributor for pets, such as fish, includes a casing in which food is received, the casing is controlled by a mechanical means or an electrical means to distribute food into a tank such that fishes in the tank can be fed. However, the fish food in the casing usually become to be a large block because the distributor is disposed on a side wall of the tank such that the food tends to be moistened. The outlet of the distributor usually is small such that the large block of fish food cannot drop therefrom and the function of the distributor is reduced.

The present invention intends to provide an improved food distributor for pets wherein the distributor has a rotatable stirring shaft disposed therein so as to stir food in the distributor to mitigate and/or obviate the above-mentioned problems.

SUMMARY OF THE INVENTION

The present invention provides a food distributor which comprises a box having a cover disposed to a top thereof and a first hole defined in a front side thereof which has an extending plate extending from a lower edge of the box. A motor is disposed to the extending plate with a shaft thereof extending through the extending plate and a gear is disposed to a distal end of the shaft.

A distributing member including a rear wall, a front wall and a peripheral wall connected between the rear wall and the front wall, at least one outlet defined in the peripheral wall. The rear wall has a first circular flange extending therefrom which has an threaded inner periphery. The rear wall has a second hole defined therein and a second circular flange extends from the rear wall to enclose the second hole therein. The front wall has a stirring shaft extending from an inner surface thereof to extend through the second hole and the stirring shaft has a stirring element extending radially therefrom.

The second circular flange is engaged with the first hole and the gear is engaged with the threaded inner periphery of the first circular flange wherein the stirring shaft extends through the first hole.

It is an object of the present invention to provide a food distributor having a stirring shaft disposed therein.

It is another object of the present invention to provide a food distributor having a box for supplying food into the distributing member therefrom.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
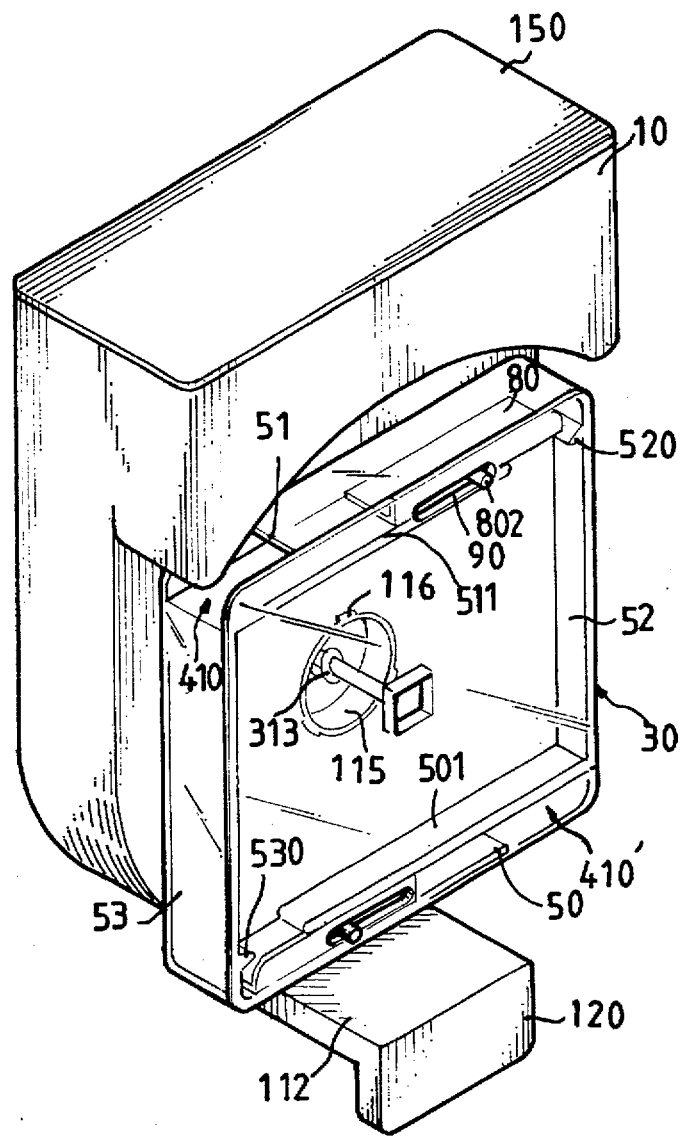
FIG. 1 is a perspective view of a food distributor in accordance with the present-invention.
Figure 2:
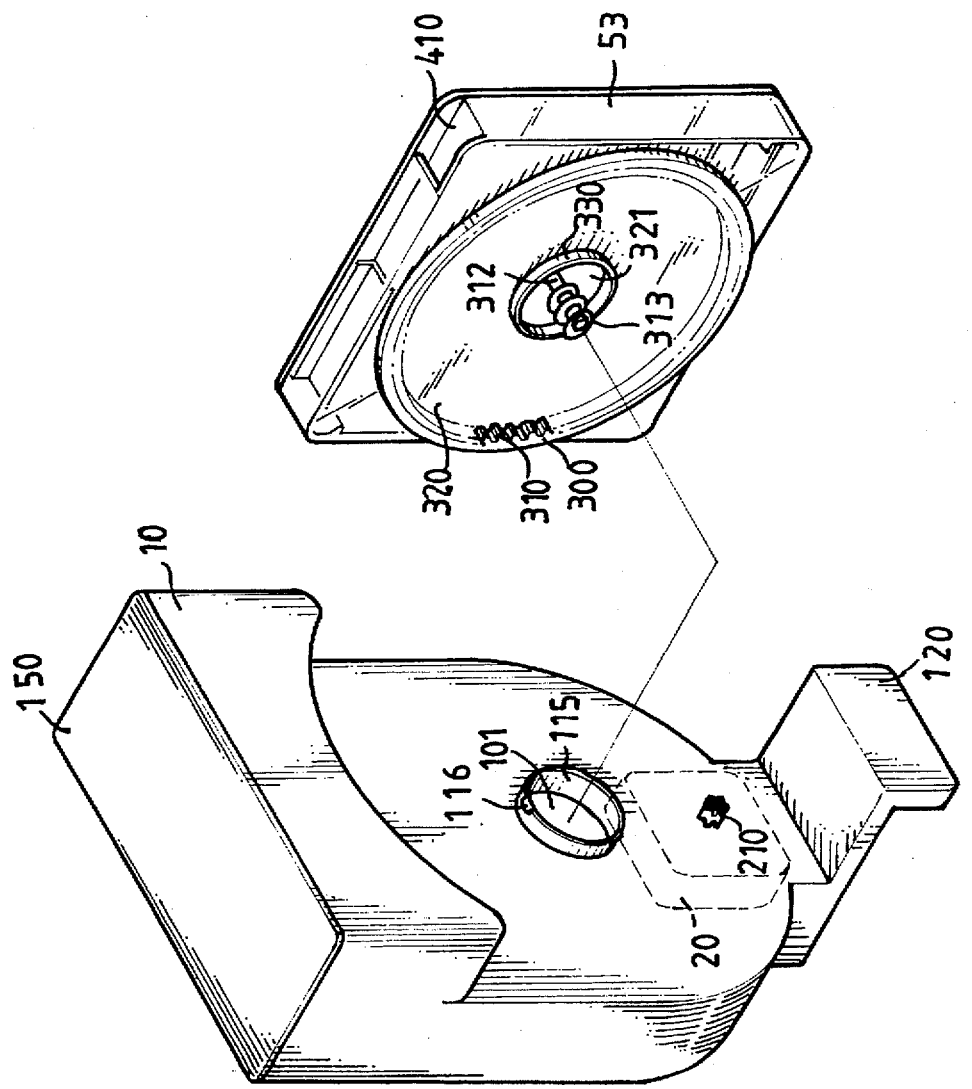
FIG. 2 is an exploded view of the food distributor in accordance with the present invention.
Figure 3:
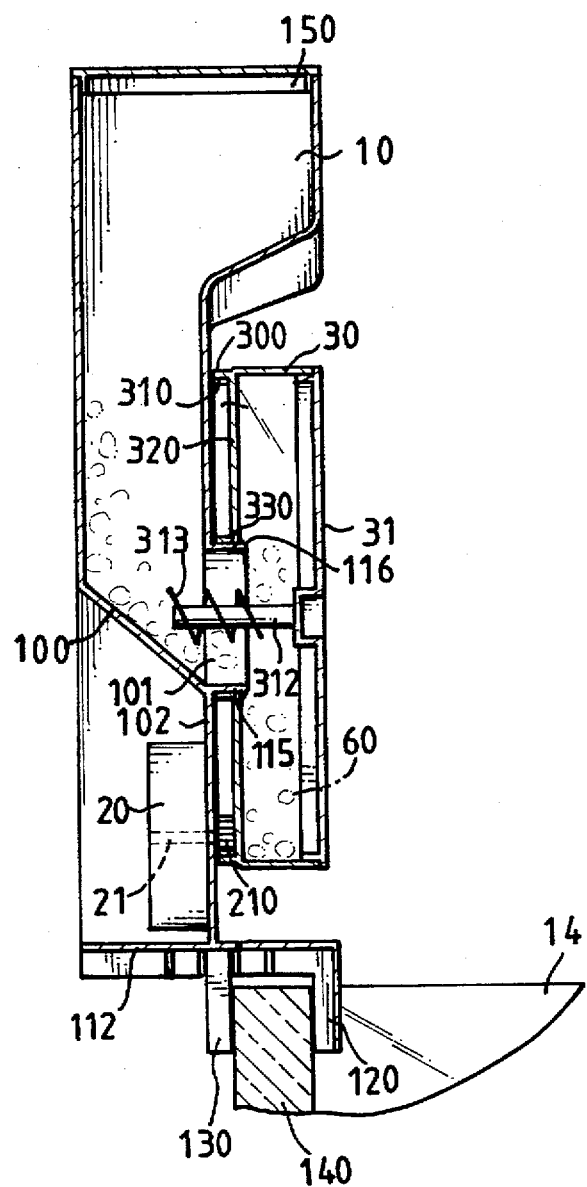
FIG. 3 is a side elevational view, partly in section, of the food distributor in accordance with the present invention.

Referring to the drawings and initially to FIGS. 1 through 3, a food distributor in accordance with the present invention generally includes a box 10 having a cover 150 removably disposed to a top thereof and a first hole 101 defined in a front side thereof which has an extending plate 102 (FIG. 3) extending from a lower edge of the box 10. A motor 20 is disposed to the extending plate 102 with a shaft 21 thereof extending through the extending plate 102 and a gear 210 is disposed to a distal end of the shaft 21. The box 10 has an inclined bottom 100 which has a lower edge connected to an inner periphery of the first hole 101. The front side of the box 10 has a tubular member 115 extending therefrom and the first hole 101 is enclosed within the tubular member 115. The tubular member 115 has a stop 116 extending radially therefrom and the stop 116 has an inclined surface formed on an top thereof.

A distributing member 30 including a rear wall 320, a front wall 31 and a peripheral wall connected between the rear wall 320 and the front wall 31. The peripheral wall includes two opposite sides 50, 51 each have an outlet 410/410' defined therein and two low plates 511, 501 each of which extends from one of the other two opposite sides 52, 53 which are perpendicular to each one of the opposite sides 50/51 and near the outlet 410/410' such that a passage is defined between each of the opposite sides 50, 51 and the respective low plate 511/501 corresponding thereto. The front wall 31 has two slots 90 defined therein each of which communicates with the passage corresponding thereto. Each of the two low plates 511, 501 has a distal end ended before the side 52/53 corresponding thereto which has a rib 520/530 extending inwardly therefrom so as to define a gap between the low plate 511/501 and the rib 520/530. Each of the low plates 511, 501 has a sliding member 80 slidably disposed thereon which has a rod 802 extending therefrom and the rod 802 extends through the slot 90 corresponding thereto such that a width of the gap between the distal end of the low plate 511/501 and the rib 520/530 can be controlled.

Figure 4:
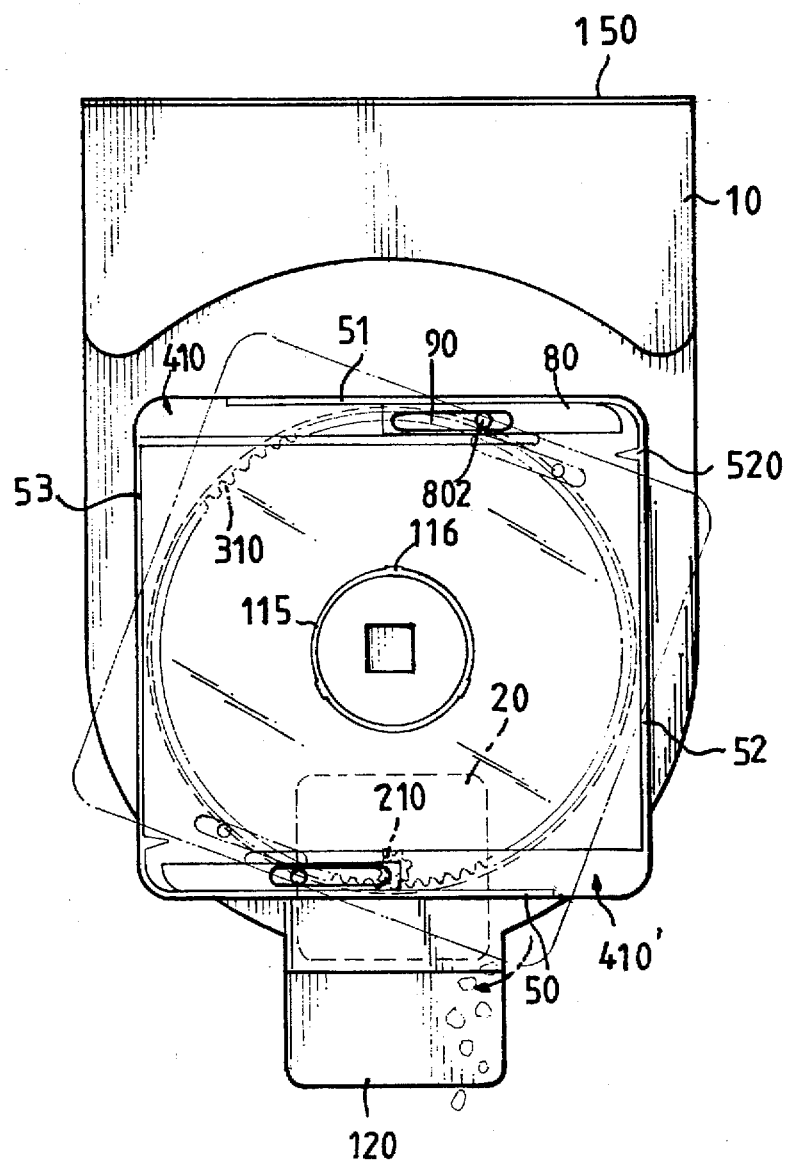
FIG. 4 is a side elevational view to show the food distributor disposed on a wall of a tank.

The rear wall 320 has a first circular flange 300 extending therefrom which has an threaded inner periphery 310 and has a second hole 321 defined therein. A second circular flange 330 extends from the rear wall 320 to enclose the second hole 321 therein such that the second circular flange 330 is rotatably mounted to the tubular member 115 with the stop 116 engaged with the rear wall 320 via the second hole 321. The front wall 31 has a stirring shaft 312 extending from an inner surface thereof, the stirring shaft 312 having an stirring element 313 extending radially therefrom and extending through the second hole 321 and the first hole 101 when the distributing member 30 is disposed to the box 10. The gear 210 is engaged with the threaded inner periphery 310 of the first circular flange 300 such that when the motor 20 is operated, the distributing member 30 is rotated about an axis of the stirring shaft 312 and food 60 in the distributing member 30 enters into the passages via the two gaps between the low plate 511/501 and the rib 520/530 to drop from the outlets 410, 410' as shown in FIG. 4.

The extending plate 102 has an engaging means disposed to a lower end thereof and the engaging means includes base portion 112 which has an end plate 120 extending downwardly therefrom and a movable plate 130 which can be moved to adjust a distance between the end plate 120 and the movable plate 130 such that a wall 140 of a tank 14 can be fixedly received between the end plate 120 and the movable plate 130. Accordingly, when the distributing member 30 is rotated, food 60 is controlled to drop into the tank 14.

Therefore, the food 60 can be supplied from the top of the box 10 without disengaging the distributing member 30 from the box 10 and the food 60 will be accumulated on the inclined bottom 100 and is stirred by the stirring shaft 312. The stirred food 60 then enters the distributing member 30 via the first hole 101 and the second hole 321.

Although the invention has been explained in relation to its preferred embodiment, it is to be understood that many other possible modifications and variations can be made without departing from the spirit and scope of the invention as hereinafter claimed.

What is claimed is:

1. A food distributor comprising:

a box having a cover disposed to a top thereof and a first hole defined in a front side thereof which has an extending plate extending from a lower edge of said box, a motor disposed to said extending plate with a shaft thereof extending through said extending plate and a gear disposed to a distal end of said shaft;

a distributing member including a rear wall, a front wall and a peripheral wall connected between said rear wall and said front wall, at least one outlet defined in said peripheral wall, said rear wall having a first circular flange extending therefrom which has an threaded inner periphery, said rear wall having a second hole defined therein and a second circular flange extending from said rear wall to enclose-said second hole therein, said front wall having a stirring shaft extending from an inner surface thereof, said stirring shaft extending through said second hole and having a stirring element extending radially therefrom, and said second circular flange engaged with said first hole and said gear engaged with said threaded inner periphery of said first circular flange wherein said stirring shaft extends through said first hole.

2. The distributor as claimed in claim 1 wherein said box has an inclined bottom which has a lower edge connected to an inner periphery of said first hole.

3. The distributor as claimed in claim 1 wherein said front side of said box has a tubular member extending therefrom and said first hole is enclosed within said tubular member, said tubular member having a stop extending radially therefrom and said stop having an inclined surface formed on an top thereof such that said second circular flange is rotatably mounted to said tubular member with said stop engaged with said rear wall via said second hole.

4. The distributor as claimed in claim 1 wherein said extending plate has an engaging means disposed thereto.

5. The distributor as claimed in claim 4 wherein said engaging means includes an end plate and a movable plate, said end plate and said movable plate having a distance formed therebetween.

* * * * *